United States Patent
Bellert

(10) Patent No.: US 10,691,936 B2
(45) Date of Patent: Jun. 23, 2020

(54) COLUMN INFERENCER BASED ON GENERATED BORDER PIECES AND COLUMN BORDERS

(71) Applicant: Konica Minolta Laboratory U.S.A., Inc., San Mateo, CA (US)

(72) Inventor: Darrell Eugene Bellert, Boulder, CO (US)

(73) Assignee: KONICA MINOLTA LABORATORY U.S.A., INC., San Mateo, CA (US)

(*) Notice: Subject to any disclaimer, the term of this patent is extended or adjusted under 35 U.S.C. 154(b) by 53 days.

(21) Appl. No.: 16/024,542

(22) Filed: Jun. 29, 2018

(65) Prior Publication Data

US 2020/0005033 A1    Jan. 2, 2020

(51) Int. Cl.
| | |
|---|---|
| G06K 9/00 | (2006.01) |
| G06F 16/26 | (2019.01) |
| G06F 40/14 | (2020.01) |
| G06F 40/163 | (2020.01) |
| G06F 40/205 | (2020.01) |

(52) U.S. Cl.
CPC ......... *G06K 9/00463* (2013.01); *G06F 16/26* (2019.01); *G06F 40/14* (2020.01); *G06F 40/163* (2020.01); *G06F 40/205* (2020.01); *G06K 9/00449* (2013.01)

(58) Field of Classification Search
CPC ............ G06K 9/00463; G06K 9/00449; G06F 17/2294; G06F 17/2705; G06F 17/2247; G06F 16/26
USPC .................................................. 715/227, 234
See application file for complete search history.

(56) References Cited

U.S. PATENT DOCUMENTS

| | | | |
|---|---|---|---|
| 5,485,566 A * | 1/1996 | Rahgozar | G06K 9/00463 382/175 |
| 2012/0317470 A1 | 12/2012 | Dejean | |
| 2013/0191715 A1* | 7/2013 | Raskovic | G06F 40/177 715/227 |
| 2013/0343658 A1 | 12/2013 | Dejean | |

(Continued)

FOREIGN PATENT DOCUMENTS

| | | | |
|---|---|---|---|
| WO | WO-03098370 A2 * | 11/2003 | ......... G06F 17/2205 |
| WO | 2014-005609 A1 | 1/2014 | |

OTHER PUBLICATIONS

"Markup;" Dec. 14, 2012; Free On-Line Dictionary of Computing; pp. 1-2.*

*Primary Examiner* — Andrew R Dyer
(74) *Attorney, Agent, or Firm* — Osha Liang LLP

(57) ABSTRACT

A method for processing an electronic document (ED) to infer columns in the ED, where the ED comprises a plurality of characters. The method includes generating a mark-up version of the ED having text-layout attributes of the characters in the ED, where the characters are grouped into paragraphs based on the text-layout attributes, and each paragraph corresponds to a paragraph bounding box surrounding a corresponding paragraph, generating border pieces by initiating a pair of left scan and right scan from each paragraph bounding box to identify any adjacent paragraph bounding box, and generating, based at least on the border pieces, column borders for use in inferring the columns in the ED, where at least one column has a vertically aligned portion of the paragraphs.

17 Claims, 15 Drawing Sheets

(56) References Cited

U.S. PATENT DOCUMENTS

2014/0013215 A1\* 1/2014 Sesum .................. G06F 17/212
715/247
2015/0095769 A1\* 4/2015 Zhang ................ G06K 9/00456
715/243

\* cited by examiner

Electronic Document (ED) 301

The Frogs & the Ox

An Ox came down to a reedy pool to drink. As he splashed heavily into the water, he crushed a young Frog into the mud.

little brother with one of his huge feet!"

He could not have been bigger than this," she said But the little Frogs all declared that the monster was much, much bigger.

The old Frog soon missed the little one and asked his brothers and sisters what had become of him.

"A great big monster," said one of them, "stepped on big, was he!" said the old Frog, puffing herself up. "Was he as big as this?"

"Oh, much bigger!" they cried.

The Frog puffed up still more.

The old Frog kept puffing herself out more and more until, all at once, she burst.

Do not attempt the impossible.

Column Border A 315

Paragraph Bounding Box B 314

Putting a Bell on the Cat

The Mice once called a meeting to decide on a plan to free themselves of their enemy, the Cat. At least they wished to find some way of knowing when she was coming, so they might have time to run away. Indeed, something had to be done, for they lived in such constant fear of her claws that they hardly dared stir from their dens by night or day.

Many plans were discussed, but none o them was thought good enough. At last a very young Mouse got up and said.

"I have a plan that seems very simple, but I know it will be successful.

All we have to do is to hang a bell about the Cat's neck. When we hear the bell ringing we will know immediately that our enemy is coming."

All the Mice were much surprised that they had ot thought of such a plan before. But in the midst of the rejoicing over their good fortune, an old Mouse arose and said.

"I will say that the plan of the young Mouse is very good. But let me ask one question: Who will bell the Cat?"

It is one thing to say that something should be done, but quite a different matter to do it.

FIG. 3F

Electronic Document (ED) 301

The Frogs & the Ox

An Ox came down to a reedy pool to drink. As he splashed heavily into the water, he crushed a young Frog into the mud.

The old Frog soon missed the little one and asked his brothers and sisters what had become of him.

"A great big monster," said one of them, "stepped on little brother with one of his huge feet!"

"Big, was he!" said the old Frog, puffing herself up. "Was he as big as this?"

"Oh, much bigger!" they cried.

The Frog puffed up still more.

"He could not have been bigger than this," she said. But the little Frogs all declared that the monster was much, much bigger.

The old Frog kept puffing herself out more and more, until, all at once, she burst.

Do not attempt the impossible.

Putting a Bell on the Cat

The Mice once called a meeting to decide on a plan to free themselves of their enemy, the Cat. At least they wished to find some way of knowing when she was coming, so they might have time to run away. Indeed, something had to be done, for they lived in such constant fear of her claws that they hardly dared stir from their dens by night or day.

Many plans were discussed, but none of them was thought good enough. At last a very young Mouse got up and said:

"I have a plan that seems very simple, but I know it will be successful.

All we have to do is to hang a bell about the Cat's neck. When we hear the bell ringing we will know immediately that our enemy is coming."

All the Mice were much surprised that they had not thought of such a plan before. But in the midst of the rejoicing over their good fortune, an old Mouse arose and said:

"I will say that the plan of the young Mouse is very good. But let me ask one question: Who will bell the Cat?"

"It is one thing to say that something should be done, but quite a different matter to do it."

Paragraph Bounding Box C 317

318 Column border B

FIG. 3G

Electronic Document (ED) 301

The Frogs & the Ox

Putting a Bell on the Cat

Column Border Bounding Box 319

FIG. 3H

Electronic Document (ED) 301

The Frogs & the Ox

An Ox came down to a reedy pool to drink. As he splashed heavily into the water, he crushed a young Frog into the mud.

1 little brother with one of his huge feet!"

2

He could not have been bigger than this," she said. But the little Frogs all declared that the monster was much, much bigger.

The old Frog soon missed the little one and asked his brothers and sisters what had become of him.

"A great big monster," said one of them, "stepped on

3

"Big, was he?" said the old Frog, puffing herself up. "Was he as big as this?"

"Oh, much bigger!" they cried.

The Frog puffed up still more.

4

The old Frog kept puffing herself out more and more until, all at once, she burst.

5

Do not attempt the impossible.

Column Border A 315

Putting a Bell on the Cat

The Mice once called a meeting to decide on a plan to free themselves of their enemy, the Cat. At least they wished to find some way of knowing when she was coming, so they might have time to run away. Indeed, something had to be done, for they lived in such constant fear of her claws that they hardly dared stir from their dens by night or day.

6 them was thought good enough. At last a very young Mouse got up and said:

"I have a plan that seems very simple, but I know it will be successful.

"All we have to do is to hang a bell about the Cat's neck. When we hear the bell ringing we will know immediately that our enemy is coming."

7 not thought of such a plan before. But in the midst of the rejoicing over their good fortune, an old Mouse arose and said:

8

"I will say that the plan of the young Mouse is very good. But let me ask one question: Who will bell the Cat?"

It is one thing to say that something should be done but quite a different matter to do it.

Many plans were discussed, but none of

9

All the Mice were much surprised that they had

318 Column border B

FIG. 3I

COLUMN INFERENCER BASED ON GENERATED BORDER PIECES AND COLUMN BORDERS

BACKGROUND

An electronic document (ED) (e.g., word processing document, spreadsheet, slide show, webpage, etc.) may include columns that are used to organize contents within the ED. A column is a vertically aligned portion of all paragraphs in the ED. Often, organizing paragraphs into columns improves readability of the ED. However, columns are not always explicitly identified (i.e., labeled and/or tagged) within the ED. Regardless, users still wish to search for the columns in the ED.

SUMMARY

In general, in one aspect, the invention relates to a method for processing an electronic document (ED) to infer columns in the ED, wherein the ED comprises a plurality of characters. The method comprises generating a mark-up version of the ED comprising text-layout attributes of the characters in the ED, wherein the characters are grouped into a plurality of paragraphs based on the text-layout attributes, and each of the plurality of paragraphs corresponds to a paragraph bounding box surrounding a corresponding paragraph, generating a plurality of border pieces by initiating a pair of left scan and right scan from each of the plurality of paragraph bounding boxes to identify any adjacent paragraph bounding box, and generating, based at least on the plurality of border pieces, a plurality of column borders for use in inferring the columns in the ED, wherein at least one column comprises a vertically aligned portion of the plurality of paragraphs.

In general, in one aspect, the invention relates to a non-transitory computer readable medium (CRM) storing computer readable program code for processing an electronic document (ED) to infer columns in the ED embodied therein, wherein the ED comprises a plurality of characters and the computer readable program code, when executed by a computer, comprises functionality for generating a mark-up version of the ED comprising text-layout attributes of the characters in the ED, wherein the characters are grouped into a plurality of paragraphs based on the text-layout attributes, and each of the plurality of paragraphs corresponds to a paragraph bounding box surrounding a corresponding paragraph, generating a plurality of border pieces by initiating a pair of left scan and right scan from each of the plurality of paragraph bounding boxes to identify any adjacent paragraph bounding box, and generating, based at least on the plurality of border pieces, a plurality of column borders for use in inferring the columns in the ED, wherein at least one column comprises a vertically aligned portion of the plurality of paragraphs.

In general, in one aspect, the invention relates to a system for processing an electronic document (ED) to infer columns in the ED, wherein the ED comprises a plurality of characters, and the system comprising a memory and a computer processor connected to the memory, generates a mark-up version of the ED comprising text-layout attributes of the characters in the ED, wherein the characters are grouped into a plurality of paragraphs based on the text-layout attributes, and each of the plurality of paragraphs corresponds to a paragraph bounding box surrounding a corresponding paragraph, generates a plurality of border pieces by initiating a pair of left scan and right scan from each of the plurality of paragraph bounding boxes to identify any adjacent paragraph bounding box, and generates, based at least on the plurality of border pieces, a plurality of column borders for use in inferring the columns in the ED, wherein at least one column comprises a vertically aligned portion of the plurality of paragraphs.

Other aspects of the invention will be apparent from the following description and the appended claims.

BRIEF DESCRIPTION OF DRAWINGS

FIGS. 3A-3L show an implementation example in accordance with one or more embodiments of the invention.

DETAILED DESCRIPTION

Figure 1:
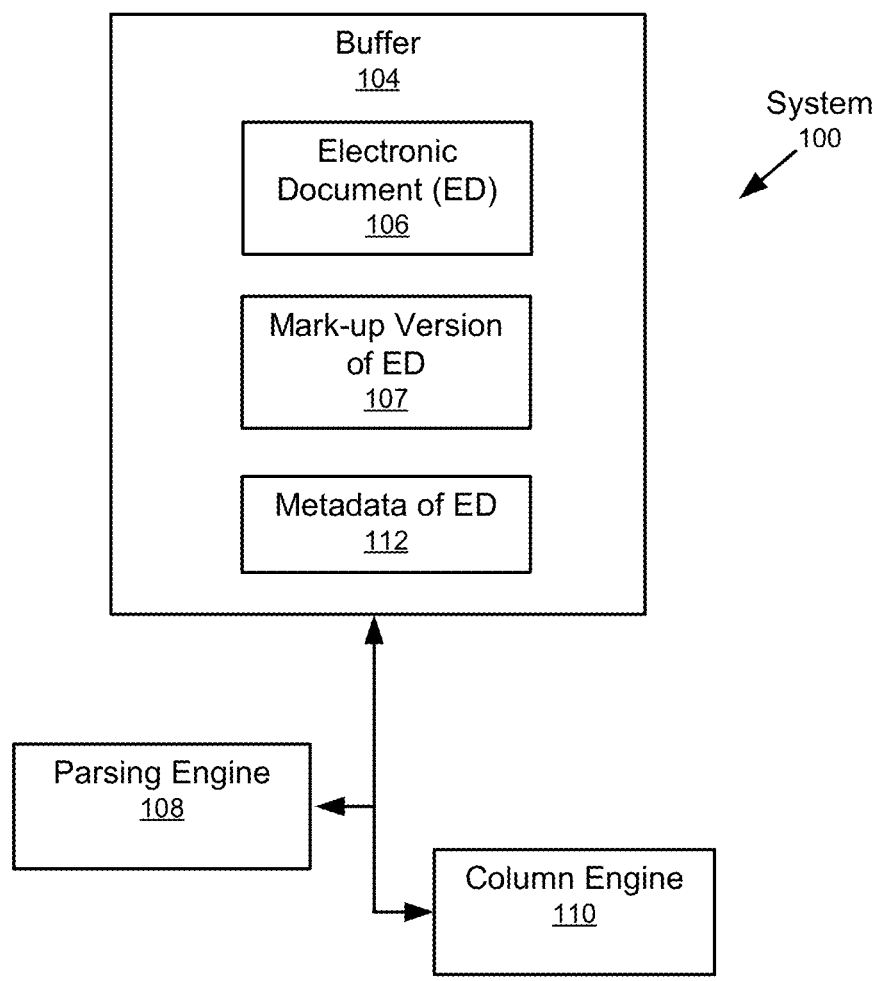
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a non-transitory computer readable medium (CRM), and a system of processing an electronic document (ED) to infer one or more columns in the ED. Specifically, an electronic document (ED) including one or more lines of text is obtained and a mark-up version of the ED is generated by parsing the ED. The mark-up version of the ED includes content, layout, and styling information of characters that make up the lines of text. One or more processes are executed on the mark-up version of the ED to group the lines of texts into paragraphs, which are scanned to generate border pieces and column borders. Based on the generated border pieces and column borders, the columns of the ED can be inferred even if the columns are not explicitly identified (i.e., labeled and/or tagged).

FIG. 1 shows a system (100) in accordance with one or more embodiments of the invention. As shown in FIG. 1, the system (100) has multiple components, including, for example, a buffer (104), a parsing engine (108), and a column engine (110). Each of these components (104, 108, 110) may be located on the same computing device (e.g., personal computer (PC), laptop, tablet PC, smart phone, multifunction printer, kiosk, server, etc.) or on different computing devices connected by a network of any size having wired and/or wireless segments. Each of these components is discussed below.

In one or more embodiments of the invention, the buffer (104) may be implemented in hardware (i.e., circuitry), software, or any combination thereof. The buffer (104) is configured to store an electronic document (ED) (106) including one or more lines of text made up of characters. The ED (106) may also include images and graphics. The ED (106) may be obtained (e.g., downloaded, scanned, etc.) from any source. The ED (106) may be a part of a collection of EDs. Further, the ED (106) may be of any size and in any format (e.g., PDF, OOXML, ODF, HTML, etc.).

In one or more embodiments of the invention, the parsing engine (108) may be implemented in hardware (i.e., circuitry), software, or any combination thereof. The parsing engine (108) parses the ED (106) to extract content, layout, and styling information of the characters in the ED and generates a mark-up version of the ED (107) based on the extracted information. The mark-up version of the ED (107) may be stored in the buffer (104).

In one or more embodiments of the invention, the styling information may include one or more text-styling attributes that identify styling details of each character in the ED (106). For example, the text-styling attributes may include a style name attribute for OOXML, a heading tag for HTML, a font size attribute, a bold attribute, an underline attribute, a font name attribute, a font color attribute, etc. This is exemplified in more detail below with reference to FIG. 3B.

In one or more embodiments of the invention, the layout information may include paragraph bounding box information (e.g., a bounding box of all content in a single paragraph of the ED (106) and bounding boxes for each line of text in a paragraph) and line spacing information. The layout information may be used to determine and/or calculate one or more text-layout attributes that identify the underlying structure of each line of text. For example, the layout information may include attributes such as a centering attribute, a white space attribute, etc. This is exemplified in more detail below with reference to FIG. 3B.

In one or more embodiments of the invention, the parsing engine (108) identifies one or more paragraphs within the ED (106) using the text-layout attributes. In one or more embodiments, a paragraph in the ED (106) may include only a single line of text. Additionally, a paragraph may not necessarily begin with an indentation.

In one or more embodiments of the invention, the text content information may include a count of the characters ("a character count") in a single and/or all paragraphs of the ED (106). For example, a paragraph may be a grouping of one or more lines of text separated from one or more other groupings of lines of text by, for example, white space. This is exemplified in more detail below with reference to FIG. 3A.

In one or more embodiments of the invention, the column engine (110) may be implemented in hardware (i.e., circuitry), software, or any combination thereof. In particular, the column engine (110) is configured to infer one or more columns in the ED (106) based on hierarchical merging of border pieces. In one or more embodiments of the invention, the column engine (110) generates a number of border pieces by initiating a pair of left scan and right scan from each paragraph bounding box to identify any adjacent bounding boxes. A border piece corresponds to a white space separating two adjacent paragraph-bounding boxes in the horizontal direction. In particular, the horizontal dimension of the border piece equals the separation between the two adjacent paragraph-bounding boxes while the vertical dimension of the border piece equals the height of the paragraph from which is scan is initiated. Based on the border pieces, the column engine (110) generates column borders for use in inferring the columns in the ED. A column border is a combination of overlapping border pieces, or a single border piece that does not overlap with any other border piece.

In one or more embodiments of the invention, the column borders are generated by hierarchical merging of the border pieces. The hierarchical merging is the merging action performed at multiple levels successively. For example, the border pieces may be merged into potential column borders, which may be in turn merged into column border groups, which may be further merged into final column borders.

In one or more embodiments of the invention, the column engine (110) performs the hierarchical merging by first generating a sorted list of border pieces based on respective locations of the border pieces. Accordingly, the column engine (110) generates a number of potential column borders by initiating a pair of forward traversal and reverse traversal of the sorted list from each border piece. In particular, the pair of forward traversal and reverse traversal identifies any overlapping border pieces for combining into one of the potential column borders. The potential column borders are then converted into final column borders using various methods of simplification, such as grouping, redundancy removal, special union, etc. described below. Throughout this disclosure, the term "column border" may refer to a potential column border or a final column border depending on the context. In one or more embodiments, the column engine (110) generates the border pieces, the sorted list, the potential column borders, and the final column borders using the method described in reference to FIG. 2 below.

In one or more embodiments of the invention, the column engine (110) generates metadata (112) for the ED (106) that includes one or more of the sorted list of border pieces, potential and final column borders, and column border groups. In one or more embodiments, the column engine (110) stores the metadata (112) in the buffer (104). Alternatively, in one or more embodiments, the column engine (110) stores the metadata (112) back into the mark-up version of the ED (107). In one or more embodiments, the metadata (112) may be stored in an external buffer and retrieved by the column engine (110) whenever the columns of the ED (106) needs to be inferred.

Although the system (100) is shown as having three components (104, 108, 110), in other embodiments of the invention, the system (100) may have more or fewer components. Further, the functionality of each component described above may be split across components. Further still, each component (104, 108, 110) may be utilized multiple times to carry out an iterative operation.

Figure 2:
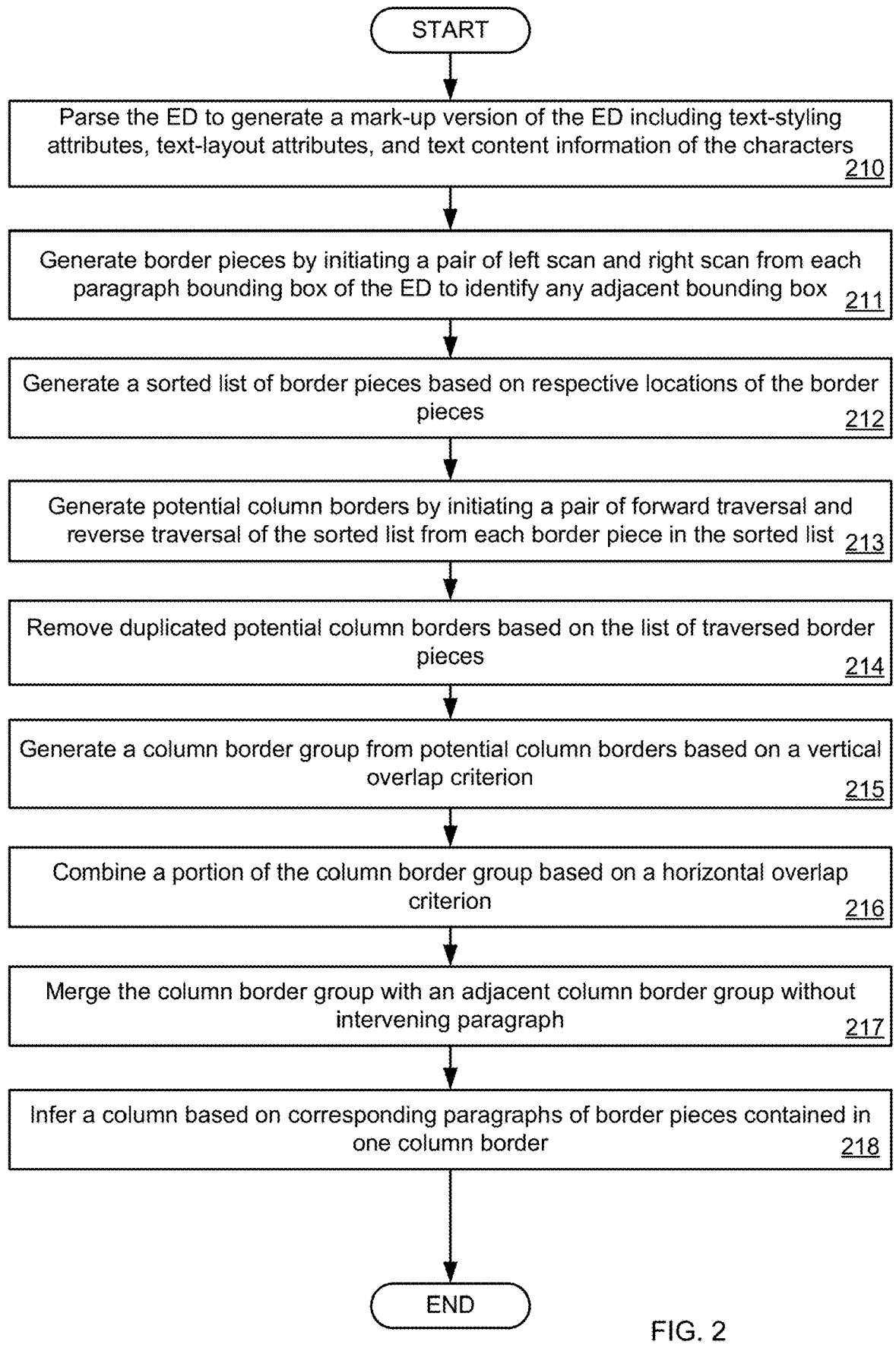
FIG. 2 shows a flowchart in accordance with one or more embodiments of the invention.

FIG. 2 shows a flowchart in accordance with one or more embodiments of the invention. The flowchart depicts a process for inferring one or more columns in an electronic document (ED). One or more of the steps in FIG. 2 may be performed by the components of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Referring to FIG. 2, initially, an ED including one of more lines of text made up of characters is obtained. The one or more lines of text form paragraphs in the ED. The ED may also include images and graphics. The ED may be obtained (e.g., downloaded, scanned, etc.) from any source. The ED may be part of a collection of EDs. Further, the ED may be of any size and in any format (e.g., PDF, OOXML, ODF, HTML, etc.).

In STEP 210, as discussed above in reference to FIG. 1, the ED is parsed to generate a mark-up version of the ED including text-styling attributes, text-layout attributes, and text content information of the characters. In particular, the characters are grouped into paragraphs based on the text-layout attributes and bounding boxes for the paragraphs are computed and stored in the mark-up.

In STEP 211 according to one or more embodiments, as discussed above in reference to FIG. 1, border pieces are generated by initiating a pair of left scan and right scan from each paragraph bounding box to identify any adjacent paragraph bounding boxes. An example of generating the border pieces is described in reference to FIGS. 3D and 3E below.

According to one or more embodiments, STEP 212 through STEP 218 below describe a first level of the aforementioned hierarchical merging where column borders are formed by merging the border pieces generated in STEP 211 above.

In STEP 212 according to one or more embodiments, as discussed above in reference to FIG. 1, a sorted list of border pieces is generated based on respective locations of the border pieces. Each border piece records geometrical information that may include or may be used to derive the upper left corner and/or lower right corner of each border piece rectangle. In one or more embodiments, the border pieces may be sorted in order of increasing vertical position going down the page based on the upper left corner of each border piece. Two border pieces with the same vertical position of the upper left corners may be placed in the sorted list in a left to right order based on the left edge of each border piece. In other embodiments, the border pieces may be sorted based on lower left corners or other geometric aspects. An example of ordering of the border pieces in the sorted list is described in reference to FIG. 3H below In STEP 213 according to one or more embodiments, as discussed above in reference to FIG. 1, potential column borders are generated by initiating a pair of forward traversal and reverse traversal of the sorted list from each of the border pieces. In one or more embodiments, the pair of forward traversal and reverse traversal identifies any overlapping border pieces for combining into a potential column border. In one or more embodiments, each potential column border is associated with a list of traversed border pieces based on a corresponding pair of forward traversal and reverse traversal. In other words, the border pieces in the list are traversed during the forward and reverse traversals that generate the particular potential column border. In one or more embodiments, the forward traversal and reverse traversal are performed iteratively using each of the border pieces as a seeding border piece. In other words, each iteration of the forward and reverse traversals is initiated from a different border piece and all border pieces are used at least once as a seeding border piece throughout the iterations. An example of generating a potential column border by combining border pieces is described in reference to FIG. 3G below.

Iterating the forward and reverse traversal starting from each border piece ensures that all border pieces are included in generating the potential column borders. In other words, no border piece is left out without being included in at least one column border. However, iterating the forward and reverse traversals starting from each border piece may result in duplication in the generated potential column borders. Such duplication may be removed by performing STEP 214 below.

According to one or more embodiments, STEP 214 through STEP 218 below describe additional levels of the aforementioned hierarchical merging where potential column borders are converted into final column borders.

In STEP 214 according to one or more embodiments, duplication among the potential column borders is removed based at least on the list of traversed border pieces of each potential column border. Two or more potential column borders, generated in STEP 213 above, having the same bounding box are considered as a duplication. In one or more embodiments, within a duplication, the potential column border having the largest list of traversed border pieces among all potential column borders is selected while other potential column borders are discarded to remove the duplication. An example of removing the duplication is described in reference to FIG. 3H below.

In STEP 215 according to one or more embodiments, a column border group is generated from the potential column borders based on a vertical overlap criterion. In one or more embodiments, the vertical overlap criterion is based on comparing vertical coordinates of two or more column border bounding boxes to determine any overlap. For example, vertical coordinates of a column border bounding box may start from the vertical coordinate of the top edge of the column border bounding box, extend through the vertical size (i.e., height) of the column border bounding box, and end at the vertical coordinate of the bottom edge of the column border bounding box. In one or more embodiments, two or more column border bounding boxes having any overlap in respective vertical coordinates are included in a column border group. Any column border that does not overlap vertically with any other column border forms its own column border group. An example of generating the column border group is described in reference to FIG. 3J below.

In STEP 216 according to one or more embodiments, a portion of the column border group is combined based on a horizontal overlap criterion. In one or more embodiments, the horizontal overlap criterion is based on comparing horizontal coordinates of two or more column border bounding boxes to determine any overlap. For example, horizontal coordinates of a column border bounding box may start from the horizontal coordinate of the left edge of the column border bounding box, extend through the horizontal size (i.e., width) of the column border bounding box, and end at the horizontal coordinate of the right edge of the column border bounding box. Two column border bounding boxes within a single column border group that have an overlap in respective horizontal coordinates are referred to as horizontally overlapped. In one or more embodiments, within a single column border group, horizontal overlap between two potential column borders is compared to a width threshold to determine if the two horizontally overlapped potential column borders are to be merged. For example, within each column border group, any two potential column borders having a horizontal overlap that exceeds a pre-determined percentage of the width of the narrower potential column border are merged into a single potential column border. In other examples, a variation of the width threshold may be used. An example of merging potential column borders within a single column border group is described in reference to FIG. 3K below.

In STEP 217 according to one or more embodiments, a column border group is merged with an adjacent column border group. In particular, two column border groups without an intervening paragraph between any corresponding column borders are merged. One column border may correspond to another column border in a different column border group if the two column borders are horizontally overlapped with each other. In other words, horizontally overlapped column borders in two adjacent column border groups are corresponding column borders. In one or more embodiments, two corresponding column borders are merged to form a single column border by removing any vertical gap between the two corresponding column borders. In other words, the merged column border has a top edge that aligns with the top-most edge of the two corresponding column borders, and has a bottom edge that aligns with the bottom-most edge of the two corresponding column borders. Accordingly, two adjacent column border groups are merged by merging corresponding column borders in the two column border groups. An example of merging column border groups is described in reference to FIG. 3K below.

In STEP 218 according to one or more embodiments, a column is inferred based on a column border group. In particular, within a column border group, paragraphs to the left and right of each column border are divided by the column border into corresponding columns. For example, with respect to a particular column border, paragraphs that generate the border pieces by right scans collectively form the column to the left of the column border. Similarly, paragraphs that generates the border pieces by left scans collectively form the column to the right of the column border. An example of inferring columns is described in reference to FIG. 3L below.

FIGS. 3A-3L show an implementation example in accordance with one or more embodiments of the invention. In one or more embodiments of the invention, the implementation example shown in FIGS. 3A-3L is based on the system and method flowchart described in reference to FIGS. 1-2 above. In one or more embodiments of the invention, one or more of elements shown in FIGS. 3A-3L may be omitted, repeated, and/or organized in a different arrangement. Accordingly, the scope of the invention should not be considered limited to the specific arrangement of elements shown in FIGS. 3A-3L.

More specifically, the implementation example shown in FIGS. 3A-3L is an example for column inferencing in electronic documents. Some electronic documents, such as PDF documents or scanned documents, do not explicitly identify columns, if present, in the document. However, for the reconstruction of the document into an editable version or for accurate extraction of the text flow from within the document, the identification of columns is beneficial.

The first step in inferring columns is document content extraction. This process reads various documents (OOXML, PDF, HTML, ODF, etc) and extracts content, layout, and styling information from the document to encode in a common predetermined structured format such as JSON or XML. This common format stores the paragraphs, lines, and runs of text as well as corresponding bounding boxes and styling information. Furthermore, this common format may store additional document content, such as images and graphics.

Figure 3A:
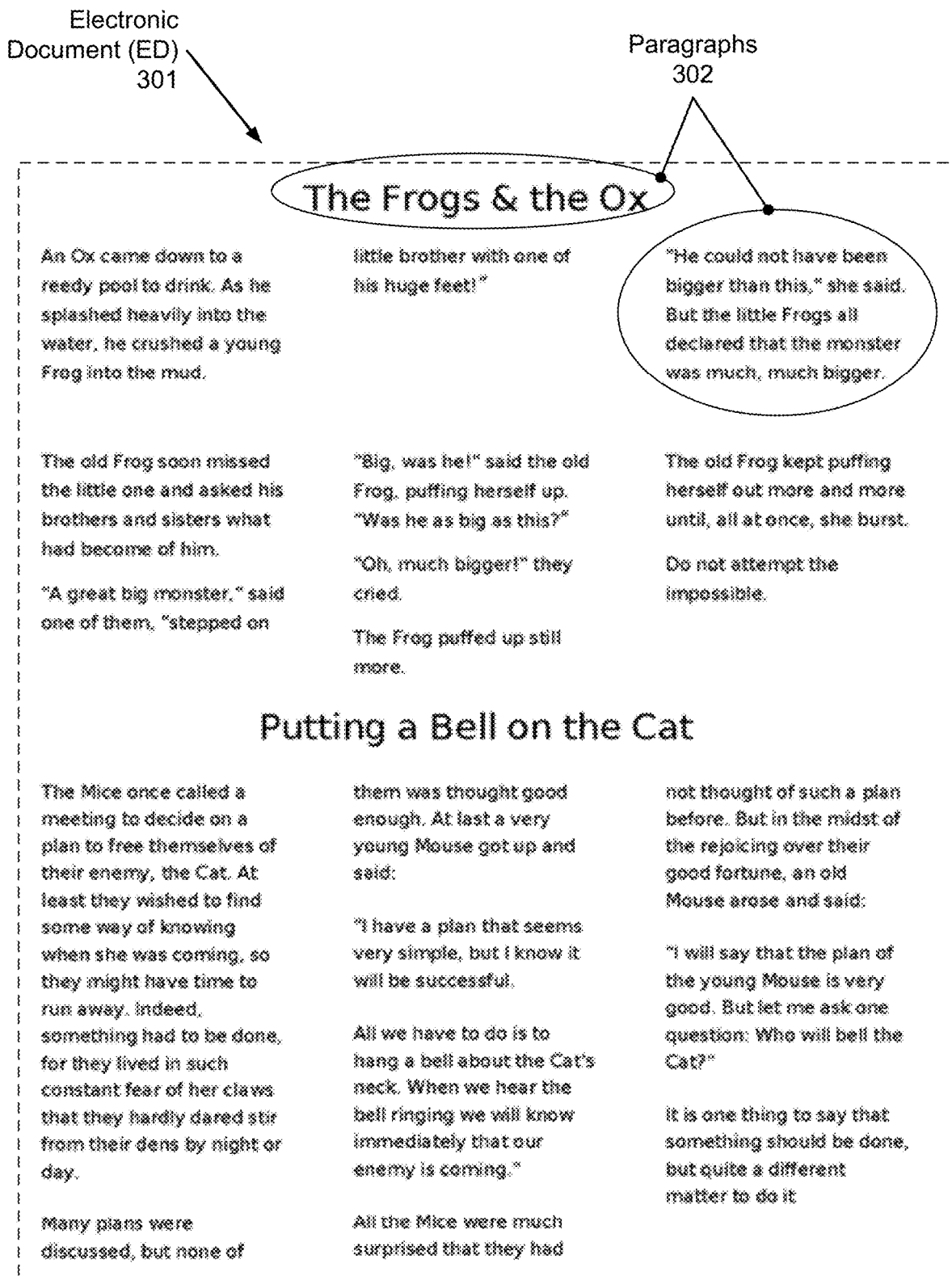
Figure 3B:
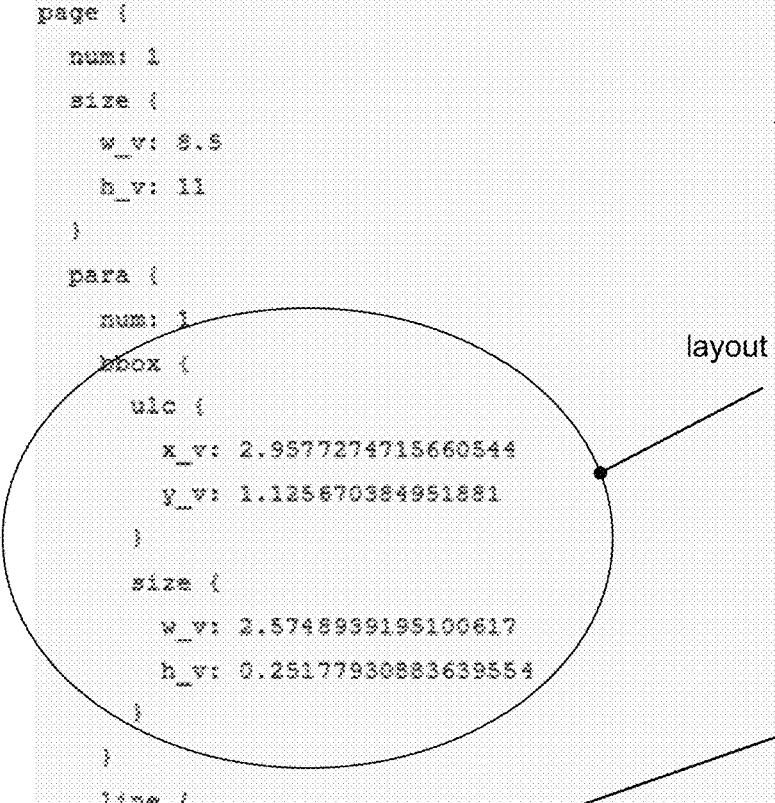

FIG. 3A shows an electronic document (ED) (301) that includes multiple lines of text made up of characters. The lines of text may be grouped into paragraphs (302). As seen in FIG. 3A, there are twenty one paragraphs (302) in total (some paragraphs are unmarked for purposes of readability). Each paragraph (302) may include a single or multiple lines of text. Each paragraph (302) also does not require an indentation. After the ED (301) is parsed, a representation of the common format for a subset of the document is shown in FIG. 3B. Note that this common format only extracts the paragraphs, corresponding lines, and the bounding box for each paragraph. The presence of any columns is not immediately visible in the extracted data. Throughout this disclosure, the bounding box for a paragraph is referred to as the paragraph-bounding box. Further, the terms "paragraph" and "paragraph-bounding box" may be used interchangebly unless explicitly specified otherwise.

FIG. 3B shows a portion of a mark-up version of the ED (301), referred to as mark-up ED (315). As seen in FIG. 3B, the mark-up ED (315) includes styling information (321), layout information (317), and content information (319) for the characters in the top-most paragraph of the ED (301). For example, content information (319) includes characters "The Frogs & the Ox" shown in FIG. 3A. As seen in FIG. 3B, the styling information (321) is presented as a variable (i.e., v: 1) that defines various features or aspects (i.e., styling) of the text (i.e., style_id). In particular, content information (319) includes all of the characters in the line of text that are applied with the styling information (321).

Figure 3C:
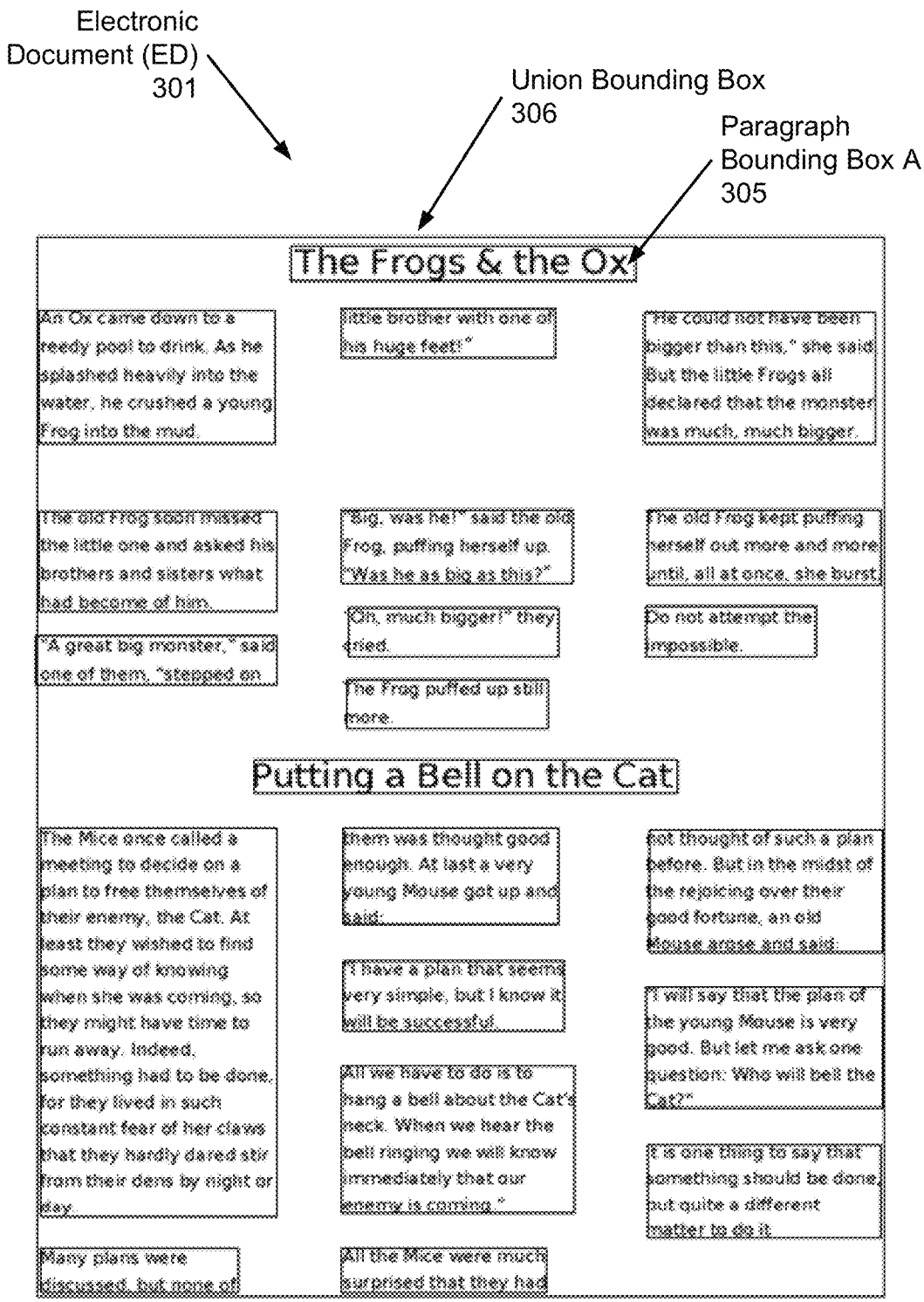

The layout information (317) includes the position and dimensions of the paragraph-bounding box A (305) shown in FIG. 3C, which are used for calculating text-layout attributes of the ED (301). For example, the x coordinate (i.e., x_v) may correspond to a horizontal coordinate of the left edge of the paragraph-bounding box A (305), while the y coordinate (i.e., y_v) may correspond to the vertical coordinate of the top edge of the paragraph-bounding box A (305). Similarly, the size parameters w_v and h_v may correspond to the width and height, respectively, of paragraph-bounding box A (305). Accordingly, the horizontal coordinate of the right edge of the paragraph-bounding box A (305) may equal x_v+w_v, while the vertical coordinate of the bottom edge of the paragraph-bounding box A (305) may equal y_v+h_v. In other examples, the horizontal and vertical coordinates of the four edges of the paragraph-bounding box A (305) may relate to the layout information (317) based on a different computation formula.

An initial scan is conducted to survey all the paragraph-bounding boxes for each paragraph. For each page in the document, the union of all paragraph-bounding boxes is accumulated and recorded. FIG. 3C shows the result of the scan including paragraph-bounding boxes (e.g., paragraph bounding box A (305)) of the paragraphs and the union bounding box (306) representing the union of all the paragraph-bounding boxes on the page.

Figure 3D:
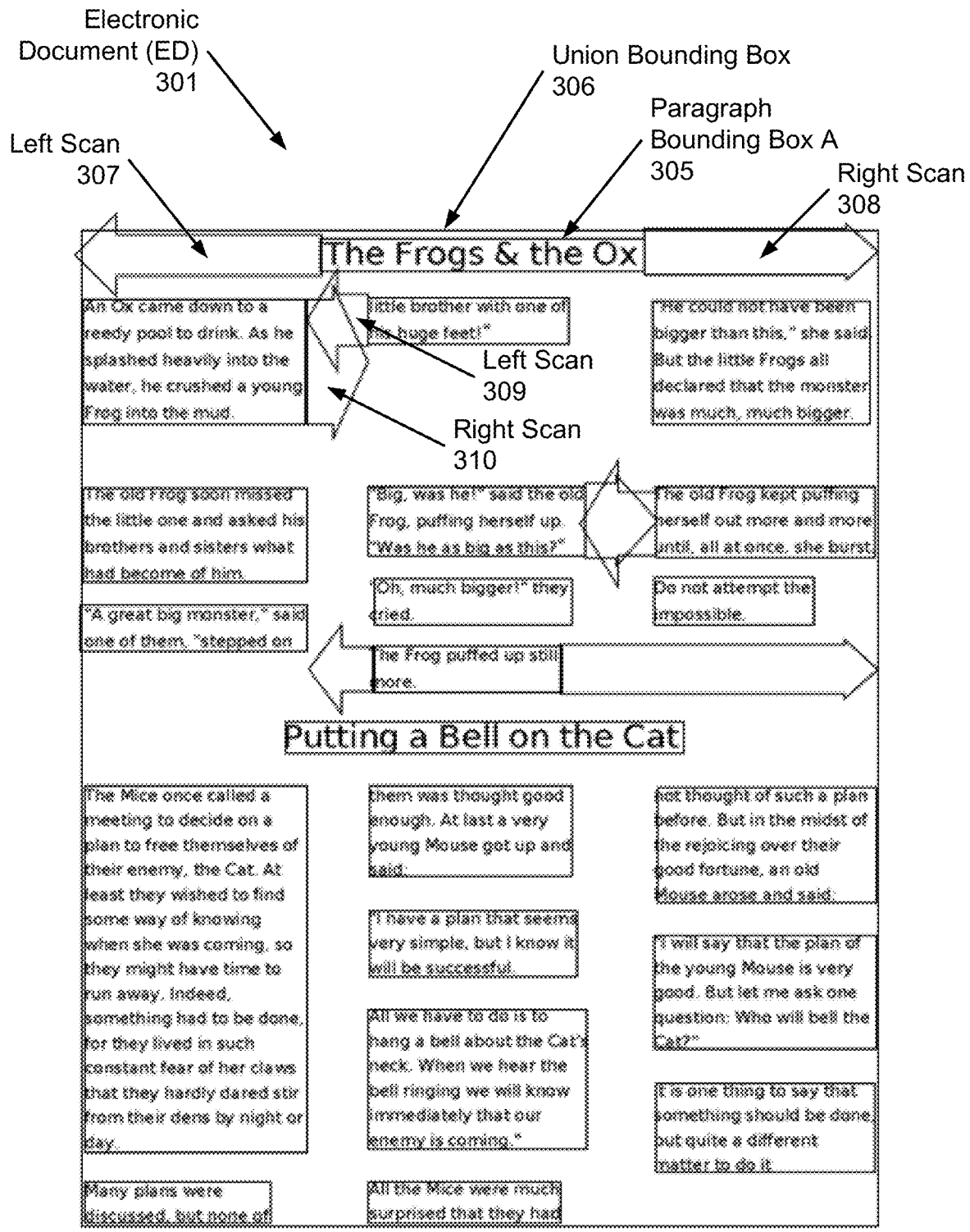

Next the column inferencing algorithm proceeds to identify pieces of the white space border between columns, referred to as border pieces. This is done by initiating a left/right scan (represented by left/right arrows in FIG. 3D) from each paragraph-bounding box and continuing the scan outwards until a neighboring bounding box is found. For example, the scan may be performed based on the layout information (317) shown in FIG. 3B above. FIG. 3D shows examples of the left/right scans. For example, the left scan (307) and right scan (308) are initiated from the paragraph-bounding box A (305) and reach the border of the union paragraph-bounding box (306) computed in the previous step. In another example, the left scan (309) and right scan (310) reach the borders of neighboring paragraph-bounding boxes computed in the previous step.

Figure 3E:
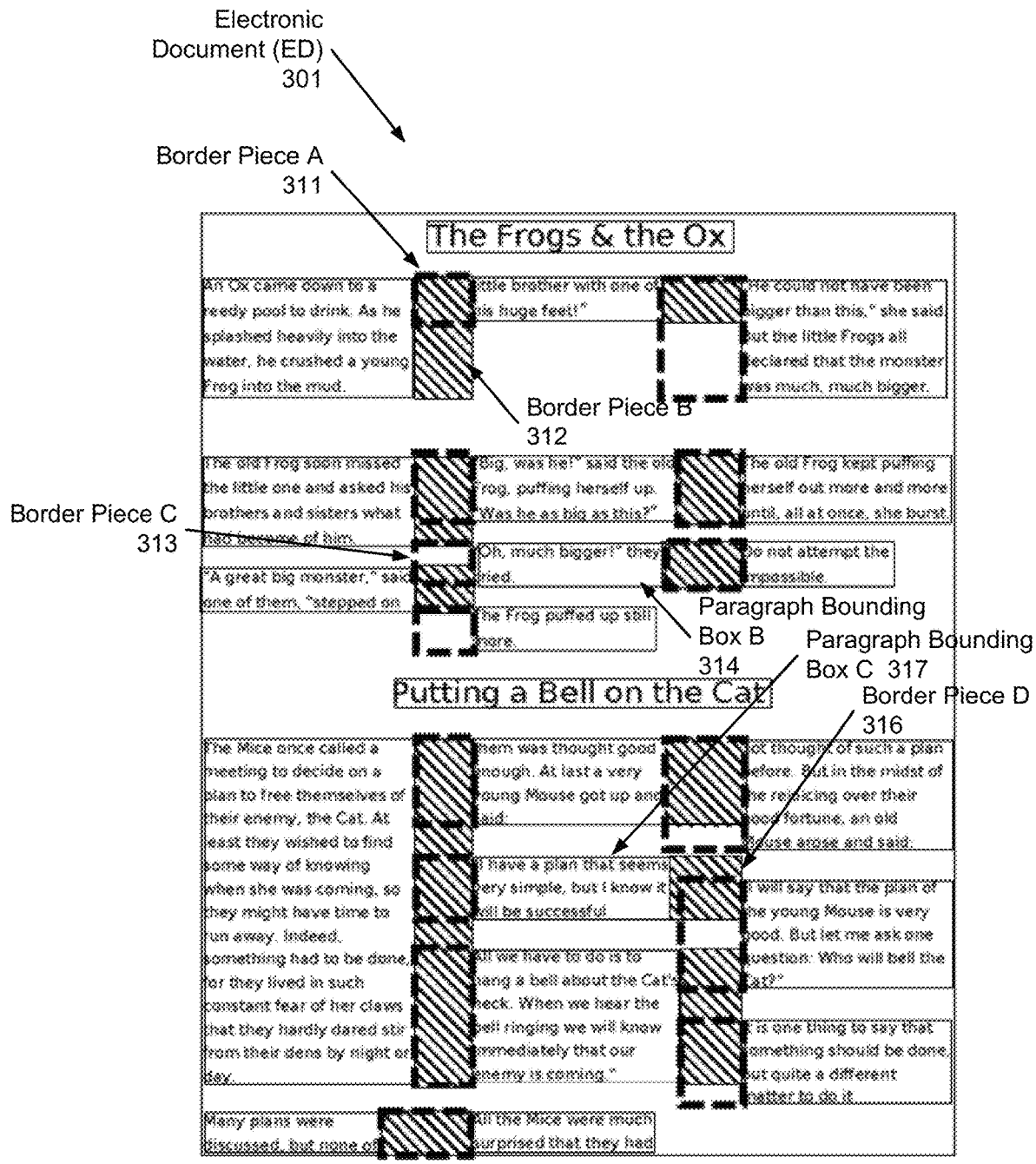

FIG. 3E shows examples of the border pieces identified by the left/right scans shown in FIG. 3D above. If the scan reaches the border of the union paragraph-bounding box (306), such as the left scan (307) and right scan (308), no border piece is generated. If the scan reaches the neighboring paragraph-bounding box, such as the left scan (309) and right scan (310), then a corresponding border piece is generated. Throughout FIGS. 3E-3H, border pieces generated from left scans are represented by unfilled boxes bounded by bold dash lines (e.g., border piece A (311)) while border pieces generate from right scans are represented by hash-filled boxes bounded by un-bolded solid lines (e.g., border piece B (312)). Each border piece records the following information:

(i) The bounding box for the border piece, referred to as border piece bounding box, such as the unfilled boxes bounded by bold dash lines and the hash-filled boxes bounded by un-bolded solid lines.
(ii) The paragraph that initiated the scan that found this border piece.
(iii) The paragraph-bounding box of the above paragraph.
(iv) The direction of the scan (left/right) that found this border piece.

Figure 3H:
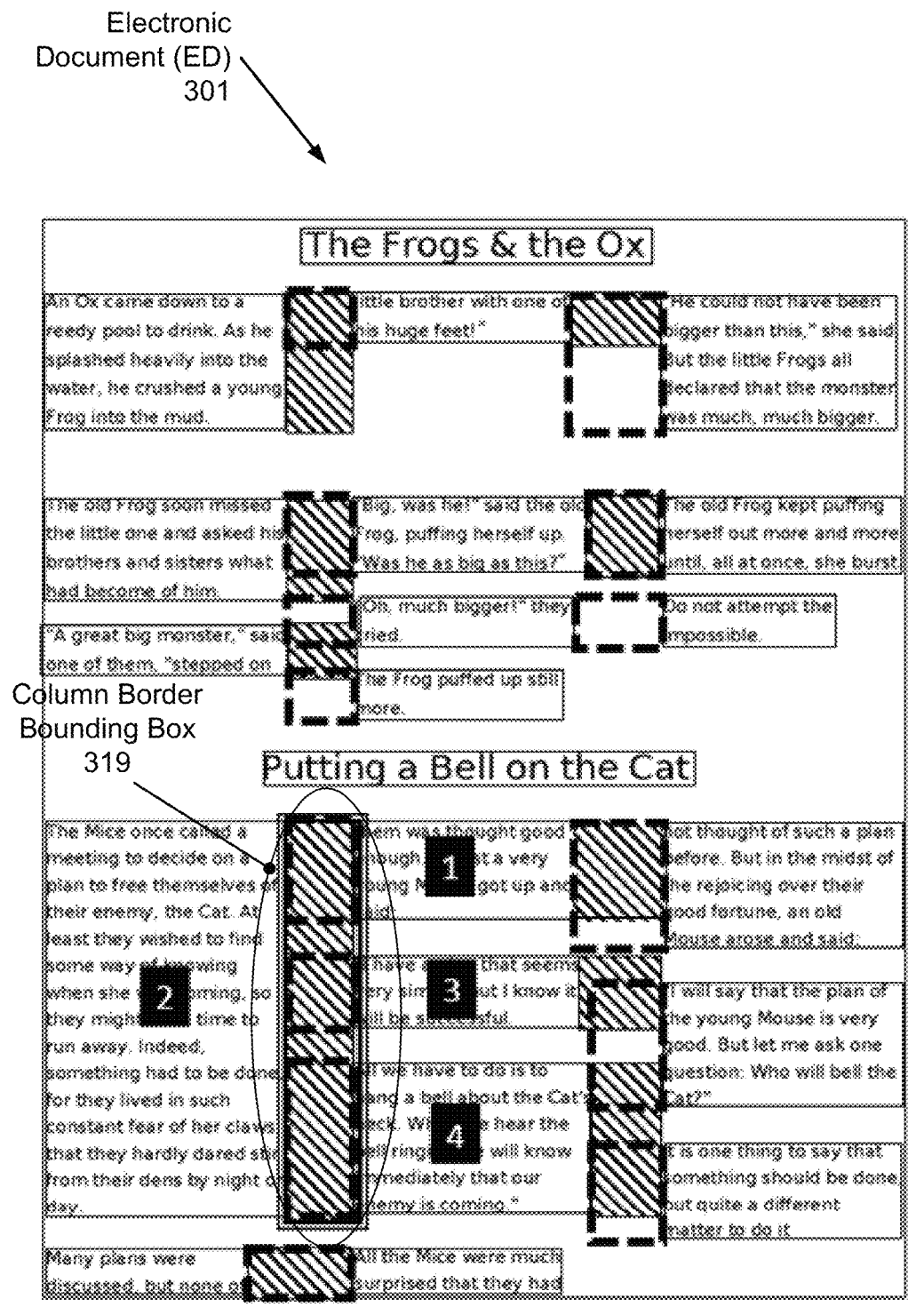

Once all the border pieces have been identified, the column inferencing algorithm proceeds to identify column borders. A sorted list is generated by sorting the border pieces first by page and then in a top down order for each page based on the upper edge of each border piece. Two border pieces with upper edges aligned to each other may be placed in the sorted list in a left to right order based on the left edge of each border piece. A portion of an example sorted list is shown in FIG. 3H where four border pieces, within the column border bounding box (319), are ordered in the sorted list as represented by the numerals "1", "2", "3", and "4" overlaying the paragraphs that generated the four border pieces.

Within each page, each border piece belongs to a unique column border. The column inferencing algorithm iterates over each border piece (referred to as a seeding border piece for each iteration) to find all other border pieces that overlap with the seeding border piece. The collection of overlapping border pieces identifies a column border. Each column border records the following information:
(i) The bounding box for the column border, referred to as the column border bounding box. The terms "column border" and "column border bounding box" may be used interchangeably unless explicitly stated otherwise.
(ii) A list of all border pieces that collectively form the column border.

More specifically, each iteration of the column inferencing algorithm performs the following steps using each border piece in the sorted list as the seeding border piece:

Step A, initialize a column border with the seeding border piece. As initialized, a column border has exactly one member and the column border bounding box equals the border piece bounding box of the seeding border piece.

Step B, starting with the border piece prior to the seeding border piece in the sorted list, traverse the sorted list in reverse order. If a traversed border piece intersects with the column border bounding box, then the column border is expanded by including this intersecting border piece and updating the column border bounding box using a special union.

Step C, starting with the border piece after the seeding border piece in the sorted list, traverse the sorted list in forward order. If a traversed border piece intersects with the column border bounding box, then the column border is expanded by including this intersecting border piece and updating the column border bounding box using the special union.

Step D, upon completing the reverse traversal and forward traversal in Step B and Step C, add the column border to a list of potential column borders if not already on the list.

In particular, the aforementioned special union combines bounding boxes by growing vertically as much as possible (a vertical true union) but contracting horizontally as much as possible (a horizontal true intersection). For example, the results of following steps A-D with the seed border piece C (313) generated by a left scan from the paragraph-bounding box B (314) results in the column border A (315), shown in FIG. 3F, which is added to the list of potential column borders. As another example, the results of following steps A-D with the seed border piece D (316) generated by a right scan from the paragraph-bounding box C (317) results in the column border B (318), shown in FIG. 3G, which also is added to the list of potential column borders.

After all the potential column borders have been generated, the next step is to cull the list. The first step in culling the list is to group all the potential column borders with the same column border bounding box together and to remove any column border bounding box with a member border piece list that is a subset of another column border bounding box.

FIG. 3H shows a column border bounding box (319) that occurs twice in the list of potential column borders. The first occurrence is generated during the forward traversal in the sorted list from the seeding border piece generated by the paragraph "1". The member border pieces of the first occurrence are associated with paragraphs "1", "2", "3", and "4". The second occurrence is generated during the reverse traversal in the sorted list from the seeding border piece generated by the paragraph "4". The member border pieces of the second occurrence are associated with paragraphs "1", "2", and "4" since there is no intersection between the border pieces generated from paragraphs "3" and "4". Since the second occurrence of the column border bounding box (319) has a member border piece list that is a subset of the member border piece list of the first occurrence, the second occurrence is culled from the list of potential column borders.

The second step in culling the list is to join any column borders that overlap with each other. If any column border intersects with another column border, then the two column borders are merged into a single column border. The resulting column border has a unique list of members and the resulting column border bounding box is constructed using the special union discussed above. In the example shown in FIG. 3A-3L, there are no overlapping column borders in the potential column border list.

Upon completing the culling, any remaining column borders in the list of potential column borders is included in a list of final column borders. The final column borders are sorted by page and then by position on the page from top to bottom based on the upper edge of each column border bounding box. FIG. 3I shows nine column borders in the list of final column borders with the sorted order according to the numerals "1" through "9" overlaying each column border. For example, the column border A (315) and column border B (318) are overlaid with numerals "3" and "8", respectively.

After all of the column borders have been identified, the column borders are then grouped together per page based on any vertical overlap. Each group records the following information:
(i) A list, per page, of all the column borders in the group.
(ii) A union bounding box of all the column border bounding boxes, per page.

Figure 3J:
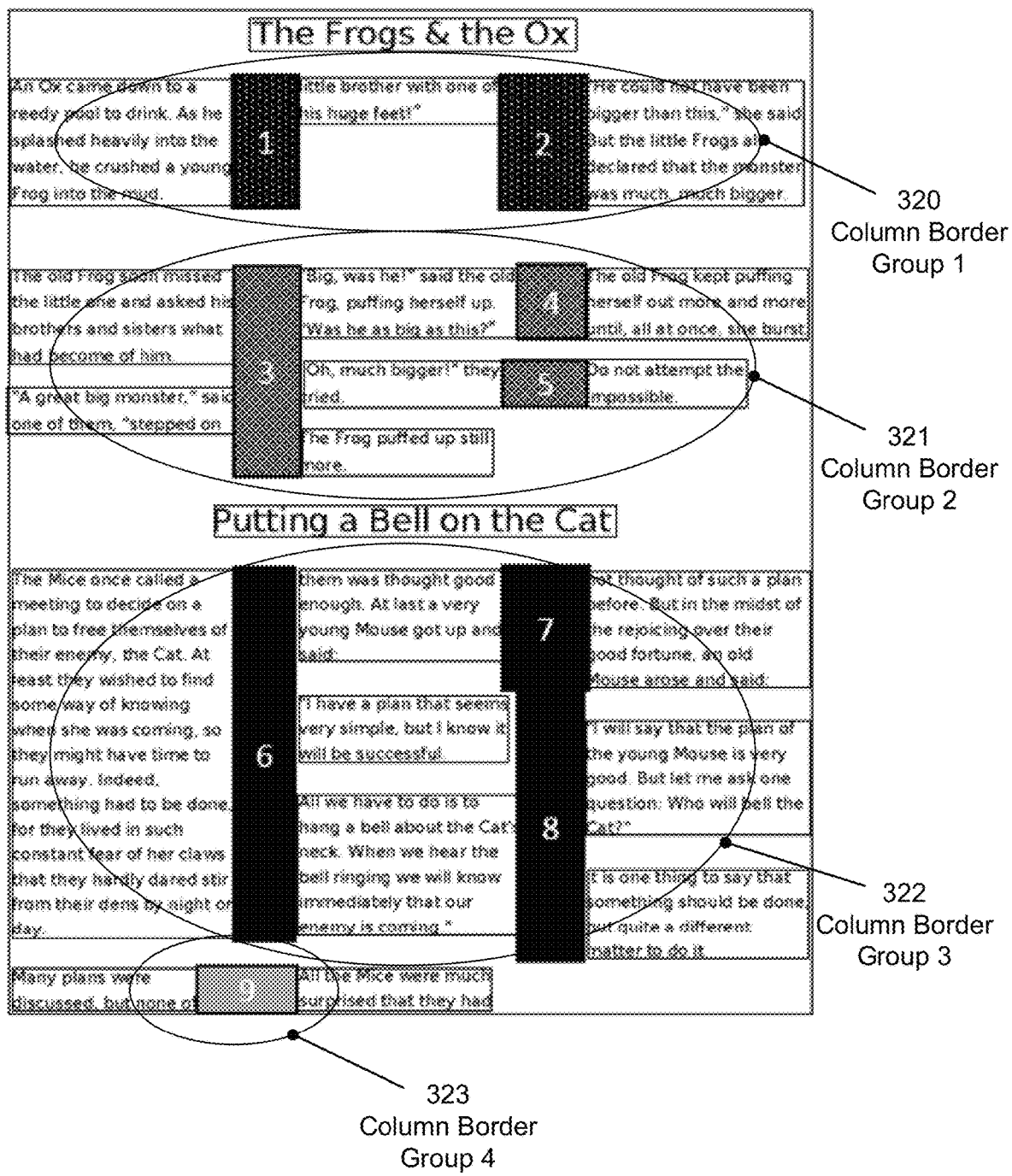

If two or more column borders overlap in the vertical direction, then this is indicative of a region with three or more columns. Each column border in the list of final column borders is inspected to determine if the corresponding column border bounding box overlaps in the vertical direction with any other column borders in the list. FIG. 3J shows four column border groups denoted with different shadings. Column borders overlaid with numerals "1" and "2" are placed in column border group 1 (320); column borders overlaid with numerals "3", "4", and "5" are placed in column border group 2 (321); column borders overlaid with numerals "6", "7", and "8" are placed in column border group 3 (322); and column border overlaid with numeral "9" is placed in column border group 4 (323).

Once column border groups have been identified, the column inferencing algorithm proceeds to determine if there are any column borders within a group that can be merged. For each column border group, the column borders in that column border group are sorted from left to right. Each column border is traversed to determine the possibility to merge with and the next column border in the column border group. If possible, the two column borders are merged.

Many different methods may be used to determine whether or not it is possible to merge two column borders. One example method ensures the ratio of the average offsets between corresponding edges of the column borders to the width of the narrower column border is small. For example, the function described below implements this example method:

```
bool borders_mergeable(const ColumnBorder &lo, const ColumnBorder
        &hi, float tol = 0.5)
{
    double left_offset = fabs(lo.GetBBox( ).Left() - hi.GetBBox( ).Left(
));
    double right_offset = fabs(lo.GetBBox( ).Right( ) - hi.GetBBox(
).Right( ));
    double average_offset = (left_offset + right_offset) / 2.0;
    double min_wid = min(lo.GetBBox( ).Width( ), hi.GetBBox(
).Width( ));
    double ratio = average_offset / min_wid;
    return ratio < tol;
}
```

In this function, "lo" and "hi" are the two consecutive column borders and "tol" is a pre-determined tolerance threshold. In particular, this function determines the merger possibility based on how closely on average the left and right edges of the two column borders align. For example, column borders overlaid with numerals "4" and "5" in column border group 2 (321) are merged and column borders overlaid with numerals "7" and "8" in column border group 3 (322) are merged to result in the seven column borders shown in FIG. 3K.

Next, the column inferencing algorithm proceeds to determine if it is possible to merge any column border groups by executing the following steps.

Step I, sorting all of column border groups based on the upper boundary of each column border group's bounding box.

Step II, iterating over each column border group to determine the possibility to merge with the next column border group. If it is possible to merge the two column border groups, each column border in one column border group is merged with a corresponding column border in the other column border group.

The following criteria are used to determine whether or not it is possible to merge two column border groups:
 (i) The current column border group must have the same or greater number of column borders than the next column border group for merging the two column border groups.
 (ii) Each column border in the next column border group must be mergeable with its counterpart in the current column border group for merging the two column border groups.
 (iii) There can be no intervening paragraphs between any two column borders for merging the two column border groups.

Figure 3K:
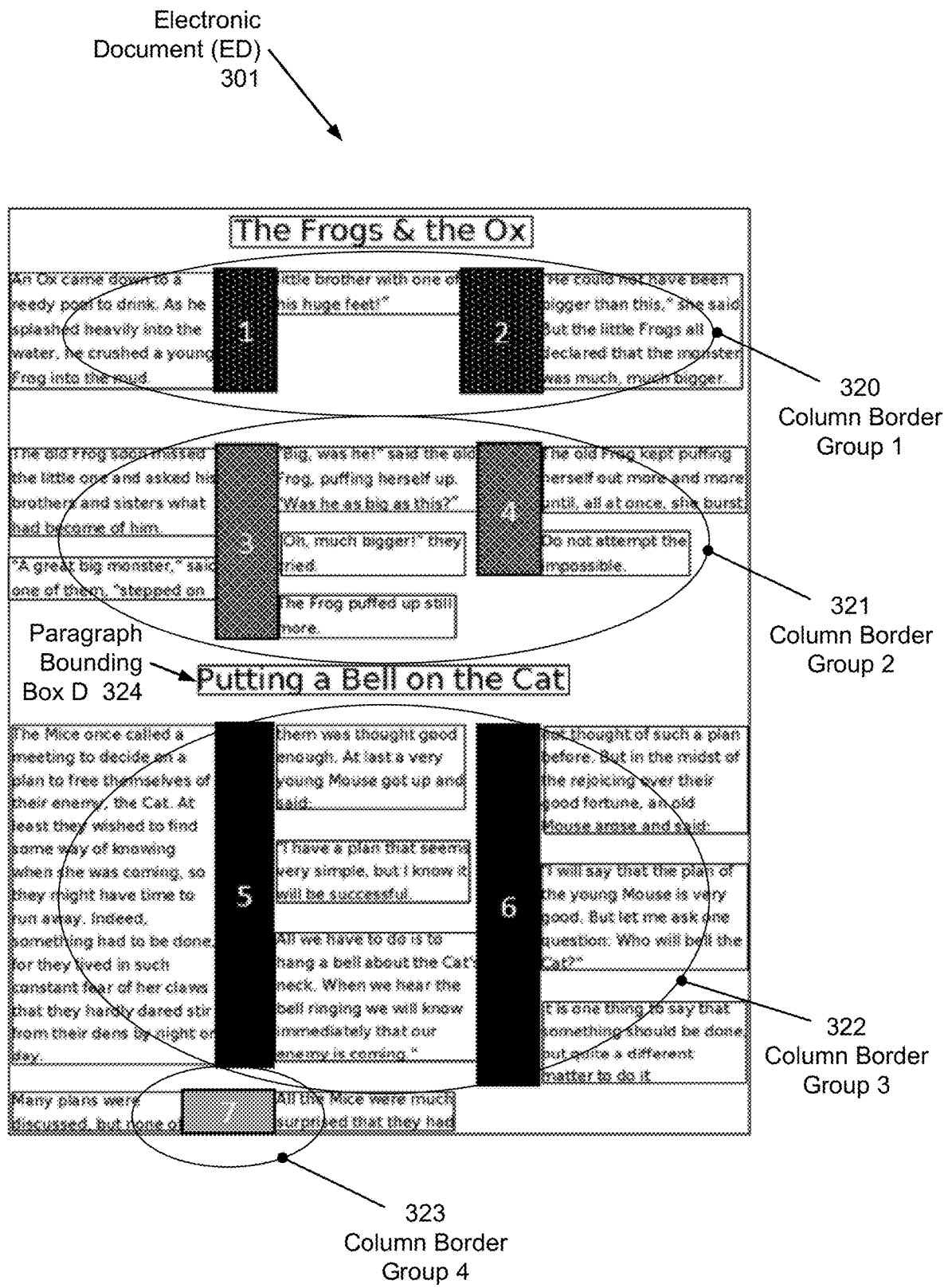
Figure 3L:
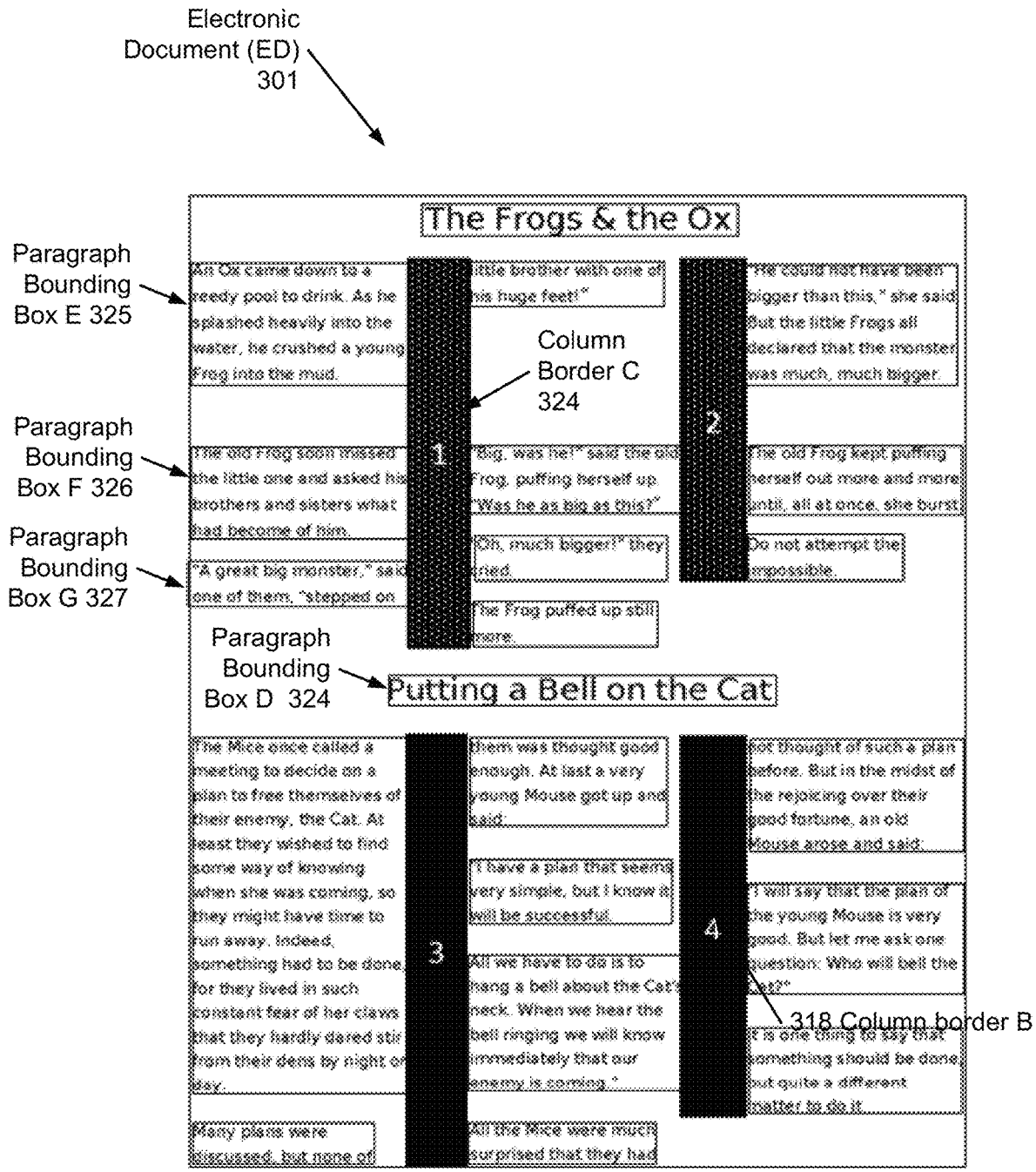

In the example shown in FIG. 3K, column border group 1 (320) and column border group 2 (321) can be merged and column border group 3 (322) and column border group 4 (323) can be merged to result in four column borders shown in FIG. 3L. In particular in FIG. 3K, the paragraph "Putting a Bell on the Cat" having the paragraph-bounding box D (324) prevents merging of the column border group 2 (321) and column border group 3 (322). Specifically, the paragraph "Putting a Bell on the Cat" having the paragraph-bounding box D (324) is an intervening paragraph between the column borders overlaid with numerals "3" and "5" and column borders overlaid with numerals "4" and "6" in the column border groups 2 (321) and 3 (322).

Based on the merged column border groups shown in FIG. 3L, the column inferencing algorithm identifies the columns on either side of the remaining column borders. This is accomplished by identifying a particular side, left or right, of the column border to build the corresponding column. Then for each border piece in the column border's list of member border pieces, the border piece with the opposite direction is selected and the corresponding originating paragraph (the paragraph that initiated the scan) is added to the column. Furthermore, a column bounding box is determined as a union of all the paragraph-bounding boxes of the paragraphs in the column.

For example, all border pieces generated from right scans are selected from the list of member border pieces of the column border C (324) to build the column that is to the left of column border C (324). The paragraphs associated with the selected border pieces correspond to the paragraph-bounding box E (325), paragraph-bounding box F (326), and paragraph-bounding box G (327). Accordingly, the column bounding box of the column to the left of column border C (324) is generated as the union of the paragraph-bounding box E (325), paragraph-bounding box F (326), and paragraph-bounding box G (327).

Figure 4:
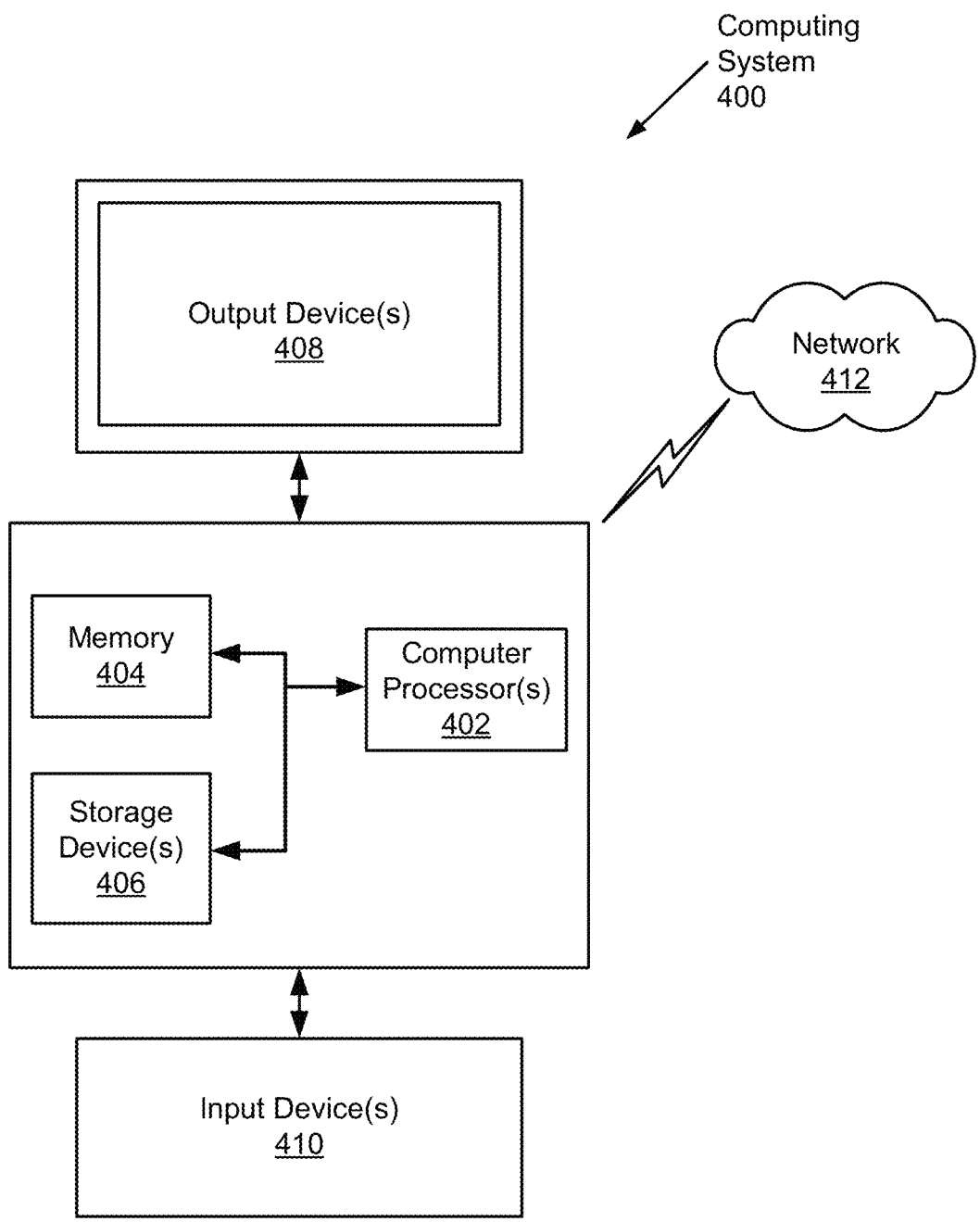
FIG. 4 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and be connected to the other elements over a network (412). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing an electronic document (ED) to infer columns in the ED, wherein the ED comprises a plurality of characters, the method comprising:
    generating a mark-up version of the ED comprising text-layout attributes of the characters in the ED, wherein
        the characters are grouped into a plurality of paragraphs based on the text-layout attributes, and
        each of the plurality of paragraphs corresponds to a paragraph bounding box surrounding a corresponding paragraph;
    generating a plurality of border pieces by initiating a pair of left scan and right scan from each of the plurality of paragraph bounding boxes to identify any adjacent paragraph bounding box, at least one scan of the left scan and the right scan being initiated from said first one of the two adjacent paragraph bounding boxes to reach a second one of the two adjacent paragraph bounding boxes, wherein at least one border piece of the plurality of border pieces comprises:
        a white space separating two adjacent paragraph bounding boxes of the plurality of paragraph bounding boxes in the horizontal direction;
        a horizontal dimension equaling a separation between the two adjacent paragraph bounding boxes;
        a vertical dimension equaling a height of a first one of the two adjacent paragraph bounding boxes;
        a direction of said at least one scan of the left scan and the right scan; and
    generating, based at least on the plurality of border pieces, a plurality of column borders for use in inferring the columns in the ED,
    wherein at least one column comprises a vertically aligned portion of the plurality of paragraphs.

2. The method of claim 1, wherein generating the plurality of column borders comprises:
    generating a sorted list of the plurality of border pieces based on respective locations of the plurality of border pieces;
    generating a plurality of potential column borders by initiating a pair of forward traversal and reverse traversal of the sorted list from each of the plurality of border pieces, wherein the pair of forward traversal and reverse traversal identifies any overlapping border pieces for combining into one of the plurality of potential column borders; and
    converting the plurality of potential column borders into the plurality of column borders.

3. The method of claim 2,
    wherein each of the plurality of border pieces corresponds to one of the plurality of paragraphs,
    wherein each of the plurality of potential column borders is associated with a list of traversed border pieces based on a corresponding pair of forward traversal and reverse traversal, and
    wherein converting the plurality of potential column borders comprises:
        removing duplication among the plurality of potential column borders based at least on the list of traversed border pieces of each of the plurality of potential column borders.

4. The method of claim 3, further comprising:
    inferring a column based on corresponding paragraphs of border pieces contained in one of the plurality of column borders.

5. The method of claim 2, wherein converting the plurality of potential column borders comprises:
    combining two or more of the plurality of potential column borders based on at least one selected from a group consisting of a horizontal overlap criterion and a vertical overlap criterion.

6. The method of claim 2, wherein converting the plurality of potential column borders comprises:
    generating, from the plurality of potential column borders, a column border group comprising two or more potential column borders based on a vertical overlap criterion,
    wherein the column border group identifies a region of the ED having three or more columns.

7. The method of claim 6, wherein converting the plurality of potential column borders further comprises:
    combining a portion of the column border group based on a horizontal overlap criterion, wherein the column border group identifies a region of the ED having three or more columns; and
    merging the column border group with an adjacent column border group, wherein no intervening paragraph exists between the column border group and the adjacent column border group.

8. A non-transitory computer readable medium (CRM) storing computer readable program code for processing an electronic document (ED) to infer columns in the ED embodied therein, wherein the ED comprises a plurality of characters and the computer readable program code, when executed by a computer, comprises functionality for:
  generating a mark-up version of the ED comprising text-layout attributes of the characters in the ED, wherein
    the characters are grouped into a plurality of paragraphs based on the text-layout attributes, and
    each of the plurality of paragraphs corresponds to a paragraph bounding box surrounding a corresponding paragraph;
  generating a plurality of border pieces by initiating a pair of left scan and right scan from each of the plurality of paragraph bounding boxes to identify any adjacent paragraph bounding box, at least one scan of the left scan and the right scan being initiated from said first one of the two adjacent paragraph bounding boxes to reach a second one of the two adjacent paragraph bounding boxes, wherein at least one border piece of the plurality of border pieces comprises:
    a white space separating two adjacent paragraph bounding boxes of the plurality of paragraph bounding boxes in the horizontal direction;
    a horizontal dimension equaling a separation between the two adjacent paragraph bounding boxes;
    a vertical dimension equaling a height of a first one of the two adjacent paragraph bounding boxes;
    a direction of said at least one scan of the left scan and the right scan; and
  generating, based at least on the plurality of border pieces, a plurality of column borders for use in inferring the columns in the ED,
  wherein at least one column comprises a vertically aligned portion of the plurality of paragraphs.

9. The CRM of claim 8, wherein generating the plurality of column borders comprises:
  generating a sorted list of the plurality of border pieces based on respective locations of the plurality of border pieces;
  generating a plurality of potential column borders by initiating a pair of forward traversal and reverse traversal of the sorted list from each of the plurality of border pieces, wherein the pair of forward traversal and reverse traversal identifies any overlapping border pieces for combining into one of the plurality of potential column borders; and
  converting the plurality of potential column borders into the plurality of column borders.

10. The CRM of claim 9,
  wherein each of the plurality of border pieces corresponds to one of the plurality of paragraphs,
  wherein each of the plurality of potential column borders is associated with a list of traversed border pieces based on a corresponding pair of forward traversal and reverse traversal, and
  wherein converting the plurality of potential column borders comprises:
    removing duplication among the plurality of potential column borders based at least on the list of traversed border pieces of each of the plurality of potential column borders.

11. The CRM of claim 9, wherein converting the plurality of potential column borders comprises:
  generating, from the plurality of potential column borders, a column border group comprising two or more potential column borders based on a vertical overlap criterion, wherein the column border group identifies a region of the ED having three or more columns.

12. The CRM of claim 11, wherein converting the plurality of potential column borders further comprises:
  combining a portion of the column border group based on a horizontal overlap criterion, wherein the column border group identifies a region of the ED having three or more columns; and
  merging the column border group with an adjacent column border group, wherein no intervening paragraph exists between the column border group and the adjacent column border group.

13. A system for processing an electronic document (ED) to infer columns in the ED, wherein the ED comprises a plurality of characters, the system comprising:
  a memory; and
  a computer processor connected to the memory that:
  generates a mark-up version of the ED comprising text-layout attributes of the characters in the ED, wherein
    the characters are grouped into a plurality of paragraphs based on the text-layout attributes, and
    each of the plurality of paragraphs corresponds to a paragraph bounding box surrounding a corresponding paragraph;
  generates a plurality of border pieces by initiating a pair of left scan and right scan from each of the plurality of paragraph bounding boxes to identify any adjacent paragraph bounding box, at least one scan of the left scan and the right scan being initiated from said first one of the two adjacent paragraph bounding boxes to reach a second one of the two adjacent paragraph bounding boxes, wherein at least one border piece of the plurality of border pieces comprises:
    a white space separating two adjacent paragraph bounding boxes of the plurality of paragraph bounding boxes in the horizontal direction;
    a horizontal dimension equaling a separation between the two adjacent paragraph bounding boxes;
    a vertical dimension equaling a height of a first one of the two adjacent paragraph bounding boxes;
    a direction of said at least one scan of the left scan and the right scan; and
  generates, based at least on the plurality of border pieces, a plurality of column borders for use in inferring the columns in the ED,
  wherein at least one column comprises a vertically aligned portion of the plurality of paragraphs.

14. The system of claim 13, wherein generating the plurality of column borders comprises:
  generating a sorted list of the plurality of border pieces based on respective locations of the plurality of border pieces;
  generating a plurality of potential column borders by initiating a pair of forward traversal and reverse traversal of the sorted list from each of the plurality of border pieces, wherein the pair of forward traversal and reverse traversal identifies any overlapping border pieces for combining into one of the plurality of potential column borders; and
  converting the plurality of potential column borders into the plurality of column borders.

15. The system of claim 14,
  wherein each of the plurality of border pieces corresponds to one of the plurality of paragraphs, wherein each of the plurality of potential column borders is associated with a list of traversed border pieces based on a corresponding pair of forward traversal and reverse traversal, and wherein converting the plurality of potential column borders comprises:

removing duplication among the plurality of potential column borders based at least on the list of traversed border pieces of each of the plurality of potential column borders.

16. The system of claim 14, wherein converting the plurality of potential column borders comprises:

generating, from the plurality of potential column borders, a column border group comprising two or more potential column borders based on a vertical overlap criterion, wherein the column border group identifies a region of the ED having three or more columns.

17. The system of claim 16, wherein converting the plurality of potential column borders further comprises:

combining a portion of the column border group based on a horizontal overlap criterion, wherein the column border group identifies a region of the ED having three or more columns; and merging the column border group with an adjacent column border group, wherein no intervening paragraph exists between the column border group and the adjacent column border group.

* * * * *